United States Patent
Yamaoka et al.

(10) Patent No.: US 8,251,811 B2
(45) Date of Patent: Aug. 28, 2012

(54) GAME MACHINE, GAME MACHINE CONTROL METHOD, AND INFORMATION STORAGE MEDIUM

(75) Inventors: Akira Yamaoka, Minato-ku (JP); Akihiro Imamura, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1071 days.

(21) Appl. No.: 12/159,734

(22) PCT Filed: Nov. 2, 2006

(86) PCT No.: PCT/JP2006/321999
§ 371 (c)(1),
(2), (4) Date: Jun. 30, 2008

(87) PCT Pub. No.: WO2007/077669
PCT Pub. Date: Jul. 12, 2007

(65) Prior Publication Data
US 2009/0280895 A1    Nov. 12, 2009

(30) Foreign Application Priority Data
Dec. 28, 2005 (JP) .................................. 2005-377143

(51) Int. Cl.
*A63F 9/24* (2006.01)
(52) U.S. Cl. ................. 463/30; 463/36; 463/43
(58) Field of Classification Search .............. 463/30, 463/36, 43
See application file for complete search history.

(56) References Cited

U.S. PATENT DOCUMENTS

| | | | |
|---|---|---|---|
| 5,696,892 A | 12/1997 | Redmann et al. | |
| 5,779,548 A * | 7/1998 | Asai et al. | 463/31 |
| 6,319,121 B1 | 11/2001 | Yamada et al. | |
| 6,322,448 B1 | 11/2001 | Kaku et al. | |
| 6,408,128 B1 * | 6/2002 | Abecassis | 386/239 |
| 6,699,127 B1 * | 3/2004 | Lobb et al. | 463/43 |

(Continued)

FOREIGN PATENT DOCUMENTS

EP    1132122 A2    9/2001
(Continued)

OTHER PUBLICATIONS

Amazon Review—ESPN NFL 2K5, published by Amazon, Jul. 26, 2004, pp. 1-9.*
Guides_ESPN NFL2K5 Guide (Xbox), pp. 1-31, game guide via IGN for the XBox, web.archive.org/web/20050208170459/http://guides.ign.com/guides/674666/.*
"Biohazard Outbreak, Dengeki Playstation", 2003 Nen 10/31, Oct. 31, 2003, pp. 92-93, Media Works Inc.
Barbara Robertoson, "Newscaster wa CG Character no Shushokusaki to Naruka?", Nikkei Computer Graphics, 2000 Nen 9 Gatsu Go, Sep. 8, 2000, ISSN0912-1609, pp. 148-155.

(Continued)

*Primary Examiner* — David L Lewis
*Assistant Examiner* — Shauna-Kay Hall
(74) *Attorney, Agent, or Firm* — Sughrue Mion, PLLC (57) ABSTRACT

A game machine includes playing content of a player in a game play part, in which the player operates an operation target, to be reflected in an action of the operation target in a video image. Reproduction data is recorded for reproducing a scene of the operation target moving in a game space according to the operation of the player. Base video image data is stored for reproducing a base video image representing a scene of a predetermined region of the game space. A video image is displayed based on a base video image and a reproduced video image such that a time of displaying a predetermined scene of the base video image and a time of displaying a scene of the operation target moving in the predetermined region in the reproduced video image based on the reproduction data are synchronized.

3 Claims, 11 Drawing Sheets

U.S. PATENT DOCUMENTS

| | | | |
|---|---|---|---|
| 6,724,385 B2* | 4/2004 | Takatsuka et al. | 345/427 |
| 6,835,137 B1* | 12/2004 | Nakamura | 463/42 |
| 2001/0023201 A1* | 9/2001 | Takatsuka et al. | 463/31 |
| 2004/0116186 A1 | 6/2004 | Shim et al. | |
| 2005/0020358 A1* | 1/2005 | Cram | 463/31 |

FOREIGN PATENT DOCUMENTS

| | | |
|---|---|---|
| EP | 1235187 A1 | 8/2002 |
| JP | 2003885 A | 1/2003 |
| JP | 2005-321965 A | 11/2005 |
| TW | 461821 | 11/2001 |
| TW | 553756 | 9/2003 |
| WO | 98/06043 A1 | 2/1998 |

OTHER PUBLICATIONS

Konami Corporation, "Metal Gear Solid 2, Substance Konami Official Guide", Dec. 19, 2002.

Taiwan Search Report dated Apr. 13, 1998.

European Office Action corresponding to European Patent Application No. 06822917.8, dated Jul. 21, 2010.

European Search Report Corresponding to Application No. 06822917.8-2218 dated Aug. 20, 2009.

David K. Elson et al.; A Lightweight Intelligent Virtual Cinematography System for Machinima Production; Columbia University.

* cited by examiner

GAME MACHINE, GAME MACHINE CONTROL METHOD, AND INFORMATION STORAGE MEDIUM

TECHNICAL FIELD

The present invention relates to a game machine, a game machine control method, and an information storage medium.

BACKGROUND ART

A game is known which includes a part (game play part) in which a player enjoys playing the game and a part (video image watching part) in which the player enjoys watching a video image which is prepared in advance (such as, for example, video images which are commonly known as demo video images). For example, among action games and shooting games including a plurality of stages, some games show video images after one stage of the game is cleared, in order to link the game story between the completed stage and the next stage.
[Non-Patent Document 1] "Metal Gear Solid 2 Substance Official Guide", KONAMI, Dec. 19, 2002

DISCLOSURE OF THE INVENTION

Problems to be Solved by the Invention

In some video images displayed in the video image watching part, an operation target to be operated by the player in the game play part may appear. However, in the related art, the action of the operation target appearing in the video image displayed in the video image watching part is predetermined and does not change each time the video image is displayed, and thus there may be cases in which the video image becomes uninteresting.

The present invention was conceived in consideration of the above-described circumstances, and an object of the present invention is to provide a game machine, a control method of a game machine, and an information storage medium which enables, in a game including a game play part and a video image watching part, playing content of a player in the game playing part, in which the player operates an operation target, to be reflected in an action of the operation target appearing in a video image displayed in the video image watching part.

Means for Solving the Problem

In order to solve at least the problem described above, according to one aspect of the present invention, there is provided a game machine which executes a game in which an operation target moves in a game space according to an operation by a player, the game machine comprising reproduction data recording means for recording reproduction data for reproducing a scene of the operation target moving in the game space according to the operation of the player, base video image data storage means for storing base video image data for displaying a base video image which is prepared in advance and which represents a scene of a predetermined region of the game space, timing determination means for determining timing for displaying a scene of the operation target moving in the predetermined region in a reproduced video image which is based on the reproduction data, and video image display controlling means for causing a video image, which is based on the base video image and the reproduced video image, to be displayed based on a determination result of the timing determination means such that timing for display of a predetermined scene of the base video image and timing for display of the scene of the operation target moving in the predetermined region in the reproduced video image are synchronized.

According to another aspect of the present invention, there is provided a control method of a game machine which executes a game in which an operation target moves in a game space according to an operation by a player, the method comprising a reproduction data recording step in which reproduction data for reproducing a scene of the operation target moving in the game space according to the operation by the player is recorded, a timing determination step in which timing for display of a scene of the operation target moving in a predetermined region of the game space in a reproduced video image which is based on the reproduction data is determined, and a video image display controlling step in which base video image data is read from base video image data storage means for storing the base video image data for displaying a base video image which is prepared in advance and which represents a scene of the predetermined region, and a video image, which is based on the base video image and the reproduced video image, is caused to be displayed on display means based on a determination result in the timing determination step such that timing for display of a predetermined scene in the base video image and timing for display of the scene of the operation target moving in the predetermined region in the reproduced video image are synchronized.

According to another aspect of the present invention, there is provided a program for causing a computer such as a home game machine, a portable game machine, a commercial game machine, a portable phone, a personal digital assistant (PDA), and a personal computer to function as a game machine which executes a game in which an operation target moves in a game space according to an operation by a player, the program causing the computer to function as reproduction data recording means for recording reproduction data for reproducing a scene of the operation target moving in the game space according to the operation of the player, base video image data storage means for storing base video image data for displaying a base video image which is prepared in advance and which represents a scene of a predetermined region of the game space, timing determination means for determining a timing for displaying a scene of the operation target moving in the predetermined region in a reproduced video image which is based on the reproduction data, and video image display controlling means for causing a video image, which is based on the base video image and the reproduced video image, to be displayed based on a determination result of the timing determination means such that timing for display of a predetermined scene of the base video image and timing for display of the scene of the operation target moving in the predetermined region in the reproduced video image are synchronized.

According to another aspect of the present invention, there is provided an information storage medium which is a computer readable information storage medium recording the above-described program. According to another aspect of the present invention, there is provided a program distribution device comprising an information storage medium storing the above-described program and which reads the program from the information storage medium and distributes the program. According to another aspect of the present invention, there is provided a program distribution method, while using an information storage medium storing the above-described program, for reading the program from the information storage medium and distributing read program.

The present invention relates to a game machine which executes a game in which an operation target moves in a game space according to an operation by a player. The "game space" may include a three-dimensional game space formed with three coordinate components and a two-dimensional game space formed with two coordinate components. In the present invention, reproduction data for reproducing a scene of the operation target moving in the game space according to the operation of the player is recorded. In addition, in the present invention, base video image data for displaying a base video image indicating a scene of a predetermined region of a game space and which is prepared in advance is stored. Moreover, timing for display of a scene of the operation target moving in the predetermined region in the reproduced video image based on the reproduction data is determined. Based on the determination result, a video image, which is based on the base video image and the reproduced video image, is displayed such that timing for display of a predetermined scene of the base video image and timing for display of a scene of the operation target moving in the predetermined region in the reproduced video image are synchronized. The present invention enables, in a game including a game play part and a video image watching part, playing content of a player in the game play part, in which the player operates an operation target, to be reflected in an action of the operation target appearing in the video image displayed in the video image watching part.

BEST MODE FOR CARRYING OUT THE INVENTION

An embodiment of the present invention will now be described in detail with reference to the drawings.

Figure 1:
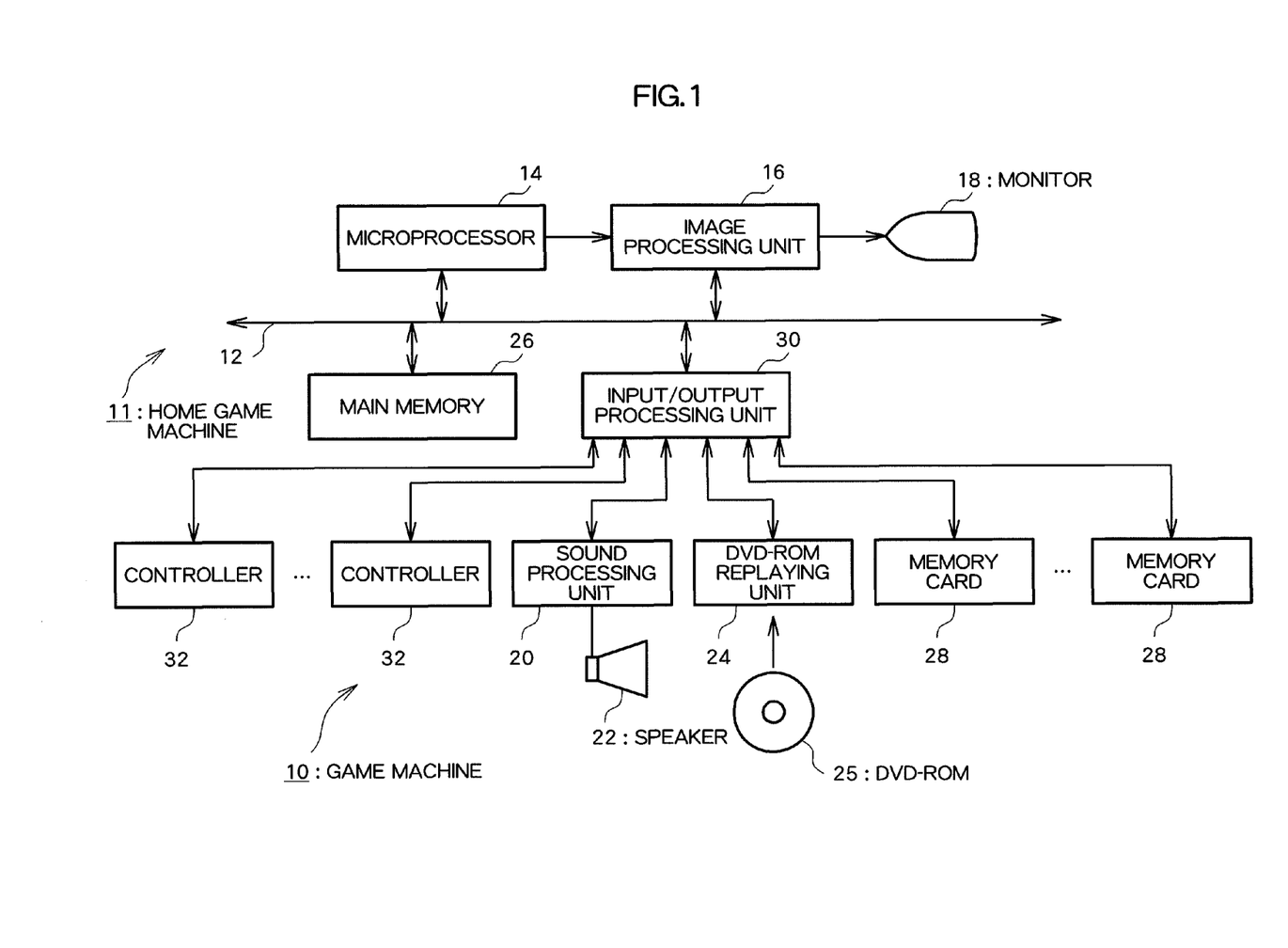
FIG. 1 is a diagram showing a hardware structure of a game machine according to an embodiment of the present invention.

FIG. 1 is a diagram showing a structure of a game machine in the embodiment of the present invention. In a game machine 10 shown in FIG. 1, a DVD-ROM 25 and a memory card 28 which are information storage media are equipped on a home game machine 11, and a monitor 18 and a speaker 22 are connected. For example, a home television receiver is used as the monitor 18 and a built-in speaker of the television receiver is used as the speaker 22.

The home game machine 11 is a known computer game system comprising a bus 12, a microprocessor 14, an image processing unit 16, a sound processing unit 20, a DVD-ROM replaying unit 24, a main memory 26, an input/output processing unit 30, and a controller 32. The constituting elements other than the controller 32 are stored in a housing.

The bus 12 is for exchange of addresses and data between the sections of the home game machine 11. The microprocessor 14, the image processing unit 16, the main memory 26, and the input/output processing unit 30 are connected by the bus 12 to enable mutual exchange of data.

The microprocessor 14 controls the sections of the home game machine 11 based on an operating system stored in a ROM (not shown), a program which is read from the DVD-ROM 25, and data which is read from the memory card 28. The main memory 26 comprises, for example, a RAM, and the program which is read from the DVD-ROM 25 and data which is read from the memory card 28 are written to the main memory 26 as necessary. The main memory 26 is also used as a working memory for the microprocessor 14.

The image processing unit 16 comprises a VRAM, and draws a game screen in the VRAM based on image data sent from the microprocessor 14. The image processing unit 16 converts the contents of the game screen into a video signal, and outputs to the monitor 18 at a predetermined timing.

The input/output processing unit 30 is an interface for the microprocessor 14 to access the sound processing unit 20, the DVD-ROM replaying unit 24, the memory card 28, and the controller 32. The sound processing unit 20, the DVD-ROM replaying unit 24, the memory card 28, and the controller 32 are connected to the input/output processing unit 30.

The sound processing unit 20 comprises a sound buffer, and replays and outputs, from the speaker 22, various sound data such as game music, sound effects of the game, a message or the like which is read from the DVD-ROM 25 and stored in the sound buffer.

The DVD-ROM replaying unit 24 reads a program recorded in the DVD-ROM 25 according to an instruction from the microprocessor 14. Here, a configuration is described in which a DVD-ROM 25 is used for supplying the program to the home game machine 11, but alternatively, it is also possible to use various other information storage media such as a CR-ROM, a ROM card, etc. Alternatively, it is also possible to employ a configuration in which the program is supplied to the home game machine 11 from a remote location through a data communication network such as the Internet.

The memory card 28 comprises a non-volatile memory (such as, for example, an EEPROM). The home game machine 11 comprises a plurality of memory card slots to which the memory card 28 can be equipped, so that a plurality of memory cards 28 can be simultaneously equipped. The memory card 28 is constructed to be detachable with from the memory card slot, and is used, for example, for storing various game data such as save data.

The controller 32 is a general-purpose operation inputting unit for the player to input various game operations. The input/output processing unit 30 periodically scans states of various sections of the controller 32 at a predetermined interval (for example, every $1/60^{th}$ of second), and sends an operation signal indicating a scan result via the bus 12 to the microprocessor 14. The microprocessor 14 determines the game operation of the player based on the operation signal. The home game machine 11 is constructed so that a plurality of controllers 32 can be connected, and the microprocessor 14 controls the game based on operation signals which are input from the controllers 32.

In the game machine 10 having the above-described structure, an action game is provided when the game program which is read from the DVD-ROM 25 is executed. The action game includes a game play part in which a player enjoys playing the game and a video image watching part in which the player enjoys watching a video image.

Figure 2:
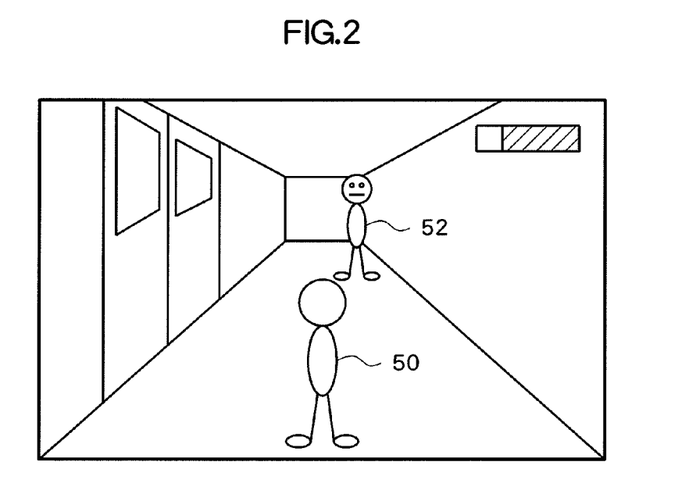
FIG. 2 is a diagram showing an example game screen.

FIG. 2 shows an example screen (game screen) displayed on the monitor 18 in the game play part. On the game screen shown in FIG. 2, a player character object 50 (operation target) and an enemy character object 52 are displayed. The player character object 50 is an operation target of the player and executes various actions according to operation of the controller 32. The enemy character object 52 is a character object which opposes the player character object 50, and is operated by the computer. In the game play part, the player operates the controller 32 while viewing the game screen, to instruct an action for the player character object 50.

Figure 3:
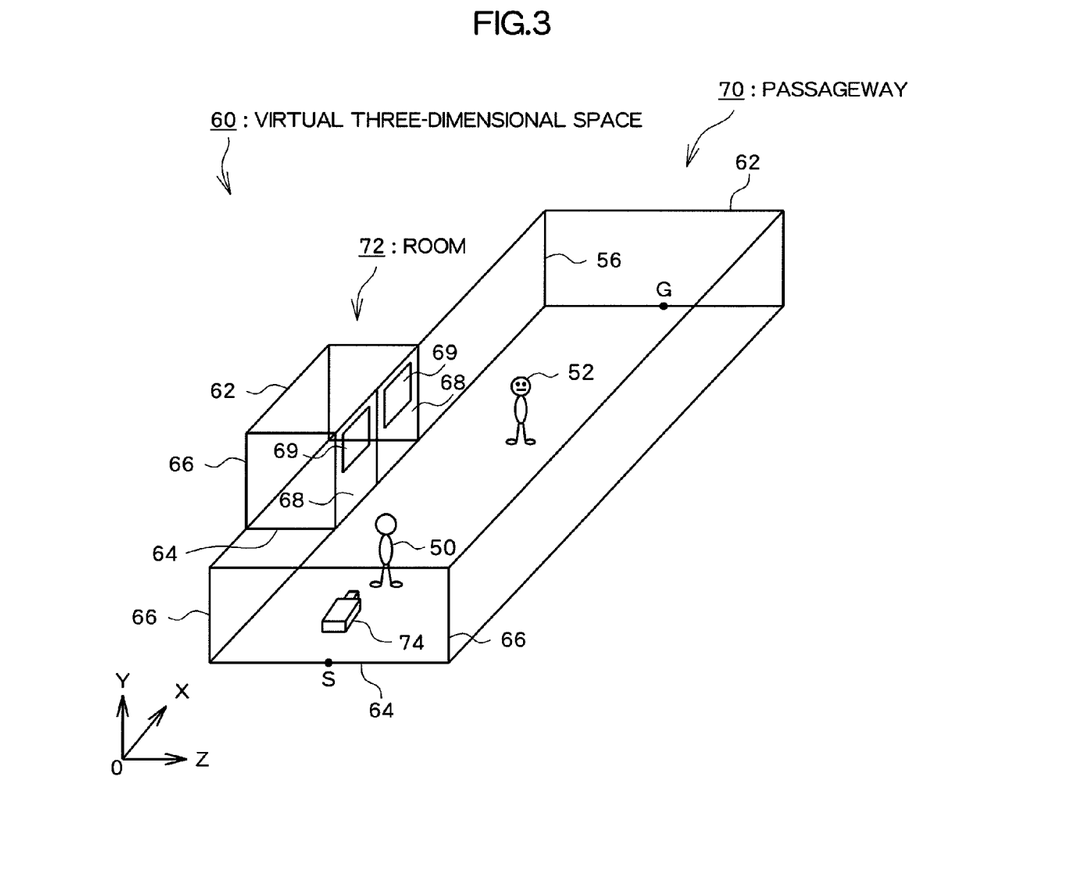
FIG. 3 is a diagram showing an example virtual three-dimensional space.

In the game play part, a virtual three-dimensional space (game space) is constructed on the main memory 26 in order to display the game screen on the monitor 18. FIG. 3 shows an example of the virtual three-dimensional space constructed on the main memory 26. A ceiling object 62, a floor object 64, a wall object 66, and a door object 68 are placed in the virtual three-dimensional space 60 shown in FIG. 3. A window 69 is formed on the door object 68. With these objects, a passageway 70 and a room 72 are formed in the virtual three-dimensional space 60.

The player character object 50 and the enemy character object 52 are placed on the floor object 64. The player character object 50 acts according to an operation with respect to the controller 32. For example, when the player executes a direction instructing operation with respect to the controller 32, the player character object 50 moves in a direction corresponding to the operation content. The enemy character object 52 acts according to a predetermined algorithm.

In addition, a virtual camera 74 (viewpoint) which moves according to movement of the player character object 50 is set in the virtual three-dimensional space 60. A game screen (refer to FIG. 2) indicating a scene of the virtual three-dimensional space 60 viewed from the virtual camera 74 is displayed on the monitor 18.

In the game play part, an object to be achieved by the player is prepared. The object to be achieved by the player may be, for example, moving the player character object 50 from a start point S to a goal point G, the start point and goal point being set in the virtual three-dimensional space 60, or defeating a particular enemy character object 52. When the player achieves the object, it is determined that the game play part is cleared.

Replay data (reproduction data) for reproducing the playing contents of the player (that is, the actions of the player character object 50) is recorded in the game play part. The reason for recording the replay data will be described later.

When the game play part is cleared, the game transitions to the video image watching part. In the video image watching part, a video image which has a roll to review the game play part and to link the story of the game to the next game play part is displayed.

Figure 4:
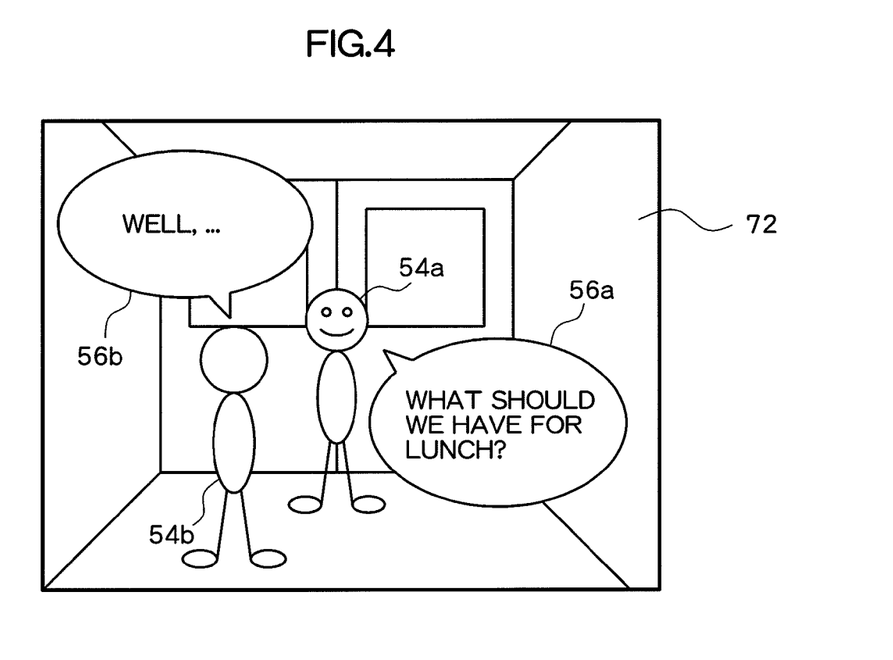
FIG. 4 is a diagram showing an example video image screen.
Figure 5:
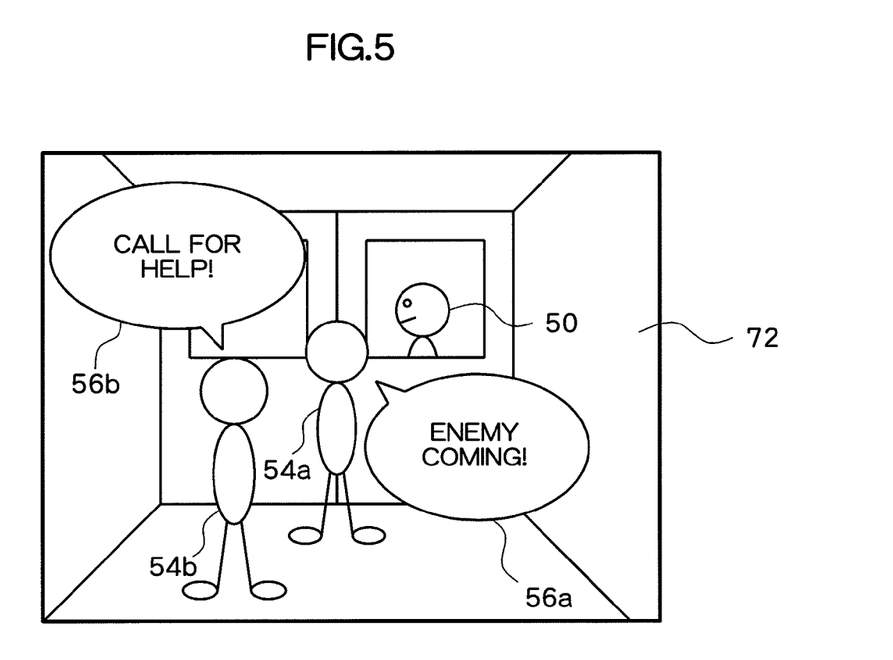
FIG. 5 is a diagram showing an example video image screen.

FIGS. 4 and 5 show an example screen (video image screen) displayed on the monitor 18 in the video image watching part. A scene of the player character object 50 appearing while enemy companion character objects 54a and 54b who are companions of the enemy character object 52 are chatting, and the enemy companion character objects 54a and 54b have noticed the player character object 50 and call for urgent assistance, is displayed on the video image screen shown in FIGS. 4 and 5. In the following description, the portion of the scene where the enemy companion character objects 54a and 54b are chatting will be described as a first half portion, and the portion of the scene where the enemy companion character objects 54a and 54b notice the player character object 50 and call for urgent assistance will be described as a second half portion. A length (period of time) of the first half portion will be described with Ta and a length (period of time) of the second half portion will be described with Tb.

FIG. 4 shows an example video image screen of the first half portion. In the video image screen of FIG. 4, enemy companion character objects 54a and 54b and bubble images 56a and 56b are displayed, and a scene of the enemy companion character objects 54a and 54b chatting in the room 72 is shown. FIG. 5, on the other hand, shows an example video image screen of the second half portion. In the video image screen of FIG. 5, a scene is displayed in which the enemy companion character objects 54a and 54b notice the player character object 50 moving in the passageway 70 and call for urgent assistance. When the video image screen of FIGS. 4 or 5 is displayed, the lines of the enemy companion character objects 54a and 54b are output as a sound from the speaker 22.

Figure 6:
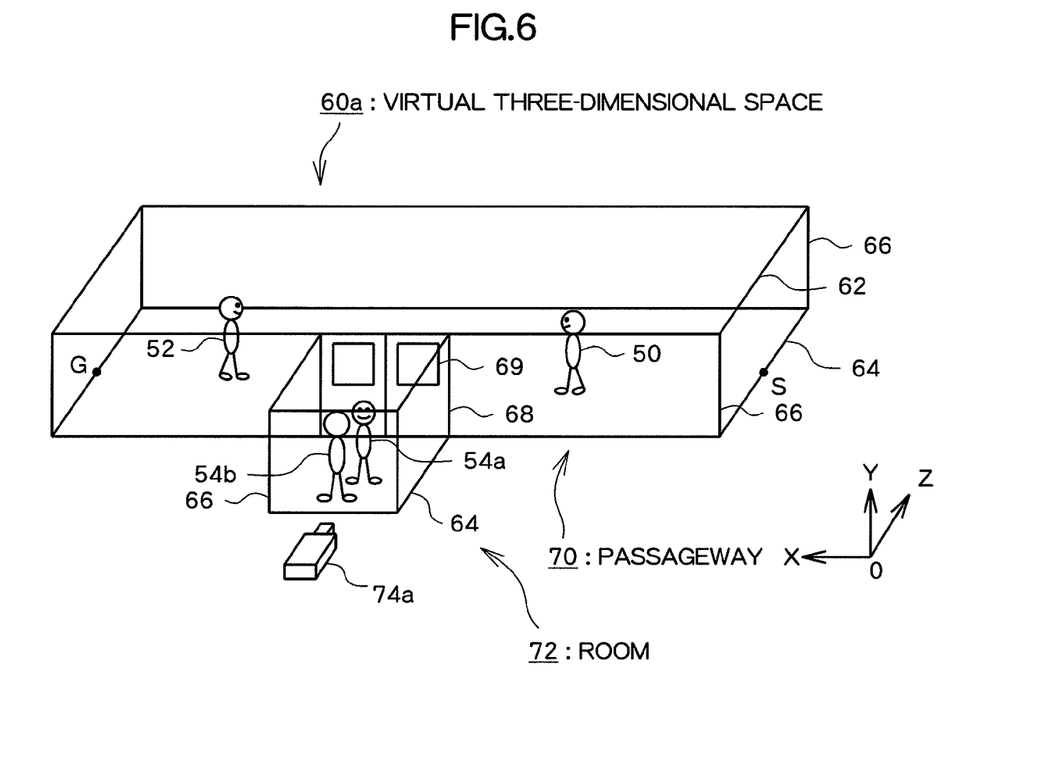
FIG. 6 is a diagram showing an example virtual three-dimensional space.

In the video image watching part, a virtual three-dimensional space as shown in FIG. 6, for example, is constructed in the main memory 26 in order to display the video image screen on the monitor 18. As shown in FIG. 6, a virtual three-dimensional space 60a is a virtual three-dimensional space similar to the virtual three-dimensional space 60 constructed in the main memory 26 in the game play part (refer to FIG. 3). However, the enemy companion character objects 54a and 54b are placed in the virtual three-dimensional space 60a. The enemy companion character objects 54a and 54b execute actions which are defined in advance.

In addition, the actions in the game play part for the player character object 50 and the enemy character object 52 are reproduced in the virtual three-dimensional space 60a. In other words, the player character object 50 acts according to the replay data recorded in the game play part. The enemy character object 52 acts according to an algorithm which is identical to the algorithm which is used for action control of the enemy character object 52 in the game play part.

In the virtual three-dimensional space 60a, the position and posture of a virtual camera 74a are set so that the scene in the room 72 (scene of the enemy companion character objects 54a and 54b) and a scene of the passageway 70 viewed through the door object 68 (window 69) are displayed. On the monitor 18, a video image is displayed in which the bubble images 56a and 56b are combined on an image showing a scene of the virtual three-dimensional space 60a viewed from the virtual camera 74a (refer to FIGS. 4 and 5).

As described, the action of the player character object 50 in the game play part is reproduced on the video image screen of the video image watching part in the present embodiment. For example, if the player has caused the player character object 50 to jump in front of the door object 68 or defeat the enemy character object 52 in the game play part, the scene is reproduced. Because of this, on the video image screen of the present embodiment, a video image in which the player character object 50 acts in a manner reflecting the playing content of the player in the game play part is displayed instead of a video image in which the player character object 50 always acts in the same manner. As a result, the player can further get carried away into the game world, and the interest of the game can be improved.

Figure 7:
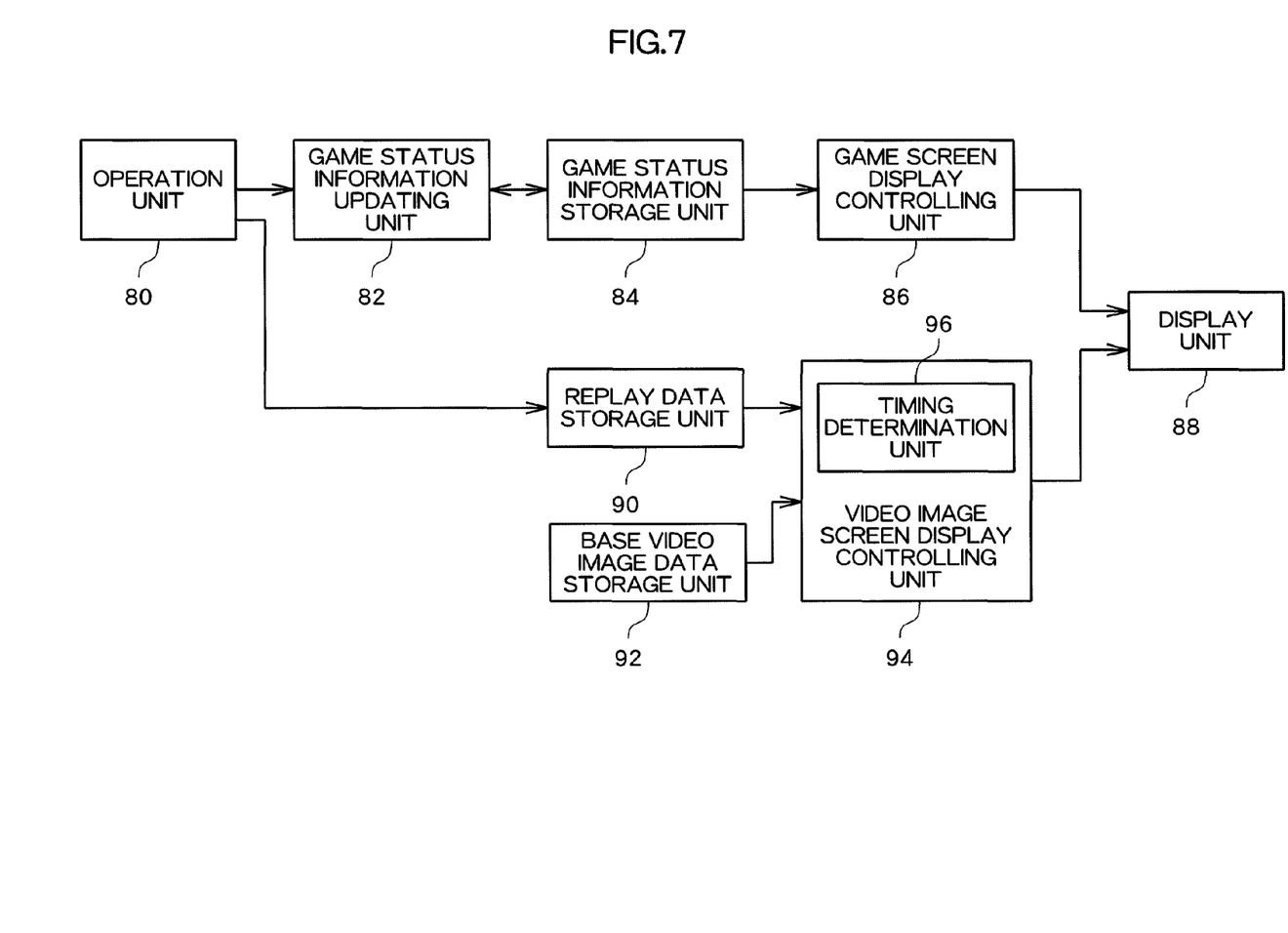
FIG. 7 is a functional block diagram of a game machine according to the embodiment of the present invention.

FIG. 7 is a functional block diagram primarily showing functions, among the functions realized in the game machine 10, related to the present invention. As shown in FIG. 7, the game machine 10 comprises functions of an operation unit 80, a game status information updating unit 82, a game status information storage unit 84, a game screen display controlling unit 86, a display unit 88, a replay data recording unit 90, a base video image data storage unit 92, and a video image screen display controlling unit 94. These functions are realized by a program which is read from the DVD-ROM 25 being executed by the microprocessor 14.

The functional blocks for executing the game play part will first be described. The operation unit 80, the game status information updating unit 82, the game status information storage unit 84, the game screen display controlling unit 86, and the display unit 88 are functional blocks for executing the game play part.

[Operation Unit]

The operation unit 80 is realized primarily with the controller 32. The operation unit 80 periodically supplies operation information indicating an operation state of the controller 32 to the game status information updating unit 82 and to the replay data recording unit 90 every predetermined period ($1/60^{th}$ of second in the present embodiment).

[Game Status Information Storage Unit]

The game status information storage unit 84 is realized primarily with the main memory 26. The game status information storage unit 84 stores game status information indicating the status of the game. For example, information indicating the current states (position, posture, etc.) of the player character object 50 and of the enemy character object 52 are stored in the game status information storage unit 84 as the game status information.

[Game Status Information Updating Unit]

The game status information updating unit 82 is realized primarily with the microprocessor 14. The game status information updating unit 82 updates the game status information stored in the game status information storage unit 84. For example, the game status information updating unit 82 updates the position and posture of the player character object 50 based on the operation information supplied from the operation unit 80. In addition, for example, the game status information updating unit 82 updates the position and posture of the enemy character object 52 according to a predetermined algorithm.

[Game Screen Display Controlling Unit and Display Unit]

The game screen display controlling unit 86 is realized primarily with the microprocessor 14 and the image processing unit 16. The display unit 88 is realized primarily with the monitor 18. For example, the game screen display controlling unit 86 generates a game screen (refer to FIG. 2) of a scene of "the virtual three-dimensional space 60 (refer to FIG. 3) in which the player character object 50 and the enemy character object 52 are placed according to the stored content of the game status information storage unit 84" viewed from the virtual camera 74, and causes the game screen to be displayed on the display unit 88.

Next, functional blocks for executing the video image watching part will be described. The replay data recording unit 90, the base video image data storage unit 92, the video image screen display controlling unit 94, and the display unit 88 are functional blocks for executing the video image watching part.

[Replay Data Recording Unit]

The replay data recording unit 90 (reproduction data recording means) is realized primarily with the microprocessor 14 and the main memory 26. The replay data recording unit 90 records replay data for reproducing a playing content of the player in the game play part (in other words, the action of the player character object 50). In the present embodiment, the replay data recording unit 90 records, in a time sequential manner, operation information periodically supplied from the operation unit 80 every predetermined time during a period from the time when the game play part is started to the time when the game play part is completed.

Alternatively, a configuration may be employed in which the replay data recording unit 90 is periodically supplied with state information (such as position and posture) of the player character object 50 from the game status information updating unit 82 every predetermined period. The replay data recording unit 90 may record, in a time sequential manner, the state information of the player character object 50 supplied from the game status information updating unit 82. In other words, a history of the state change of the player character object 50 from the time when the game play part is started to the time when the game play part is completed may be recorded in the replay data recording unit 90.

[Base Video Image Data Storage Unit]

The base video image data storage unit 92 is realized primarily with the DVD-ROM 25. The base video image data storage unit 92 stores base video image data. The base video image data is data for displaying a portion (base video image) of the video image (refer to FIGS. 4 and 5) displayed in the video image watching part other than the video image portion of the player character object 50 and the enemy character object 52.

In the present embodiment, the base video image data storage unit 92 stores the data for generating the base video image as the base video image data. For example, the base video image data storage unit 92 stores data which shows, in a time sequential manner, changes of states (such as position and posture) of the enemy companion character objects 54a and 54b at every predetermined period ($1/60^{th}$ of second in the present embodiment). In addition, for example, data indicating, in a time sequential manner, a change of a state (position and posture) of the virtual camera 74a at every predetermined period is stored. In addition, image data and sound data of the bubble images 56a and 56b indicating the lines of the enemy companion character objects 54a and 54b are stored along with information indicating the output timing.

[Video Image Screen Display Controlling Unit]

The video image screen display controlling unit 94 is realized primarily with the microprocessor 14 and the image processing unit 16. The video image screen display controlling unit 94 causes a video image to be displayed on the display unit 88, the video image being based on a base video image which is based on the base video image data stored in the base video image data storage unit 92 and a replay video image (video image in which a scene of the player character object 50 acting according to the operation of the player is reproduced) which is based on the replay data recorded in the replay data recording unit 90.

Figure 8:
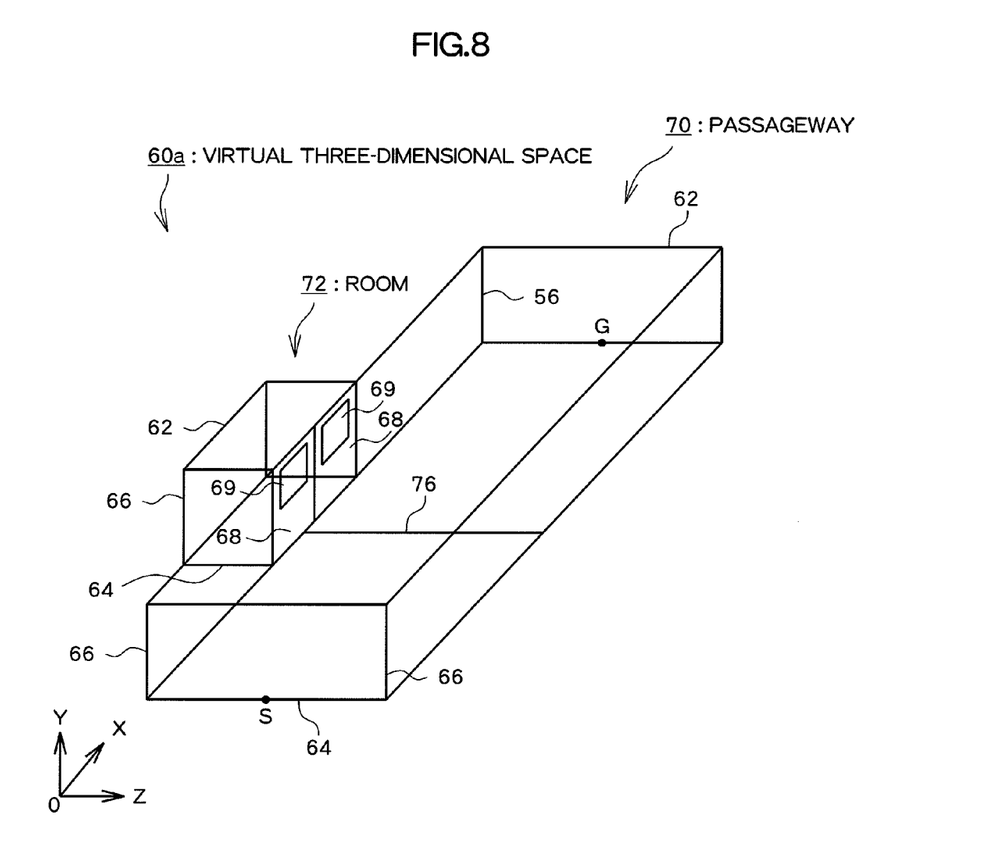
FIG. 8 is a diagram for explaining a determination reference line.

The video image screen display controlling unit 94 comprises a timing determination unit 96. The timing determination unit 96 determines the timing, in the replay video image based on the replay data recorded by the replay data recording unit 90, for display of a scene of the player character object 50 moving in a predetermined region. In the present embodiment, for example, a determination reference line 76 as shown in FIG. 8 is set in the virtual three-dimensional space 60a. The determination reference line 76 is set in consideration of a position and a posture of the virtual camera 74a at the time of starting the reproduction of the second half portion of the base video image. As described above, because the scene of the passageway 70 viewed from the virtual camera 74a through the door object 68 (window 69) is displayed on the video image screen in the present embodiment, the determination reference line 76 is set at a position corresponding to the position of one of the door objects 68 (window 69). The timing determination unit 96 determines the timing for display of a scene of the player character object 50 reaching the determination reference line 76 in the replay video image based on the replay data recorded by the replay data recording unit 90.

In the present embodiment, the video image screen display controlling unit 94 (video image display controlling means) combines the base video image which is based on the base video image data stored in the base video image data storage unit 92 and the replay video image which is based on "replay data, of the replay data recorded in the replay data recording unit 90, corresponding to a given period before and/or after a timing determined by the timing determination unit 96" in a manner such that a timing for display of a predetermined scene in the base video image and a timing for display of a scene of the player character object 50 moving in a predetermined region in the replay video image are synchronized, and causes the combined image to be displayed on the monitor 18. Details will be described later (refer to FIG. 12).

Next, a process executed by the game machine 10 will be described.

Figure 9:
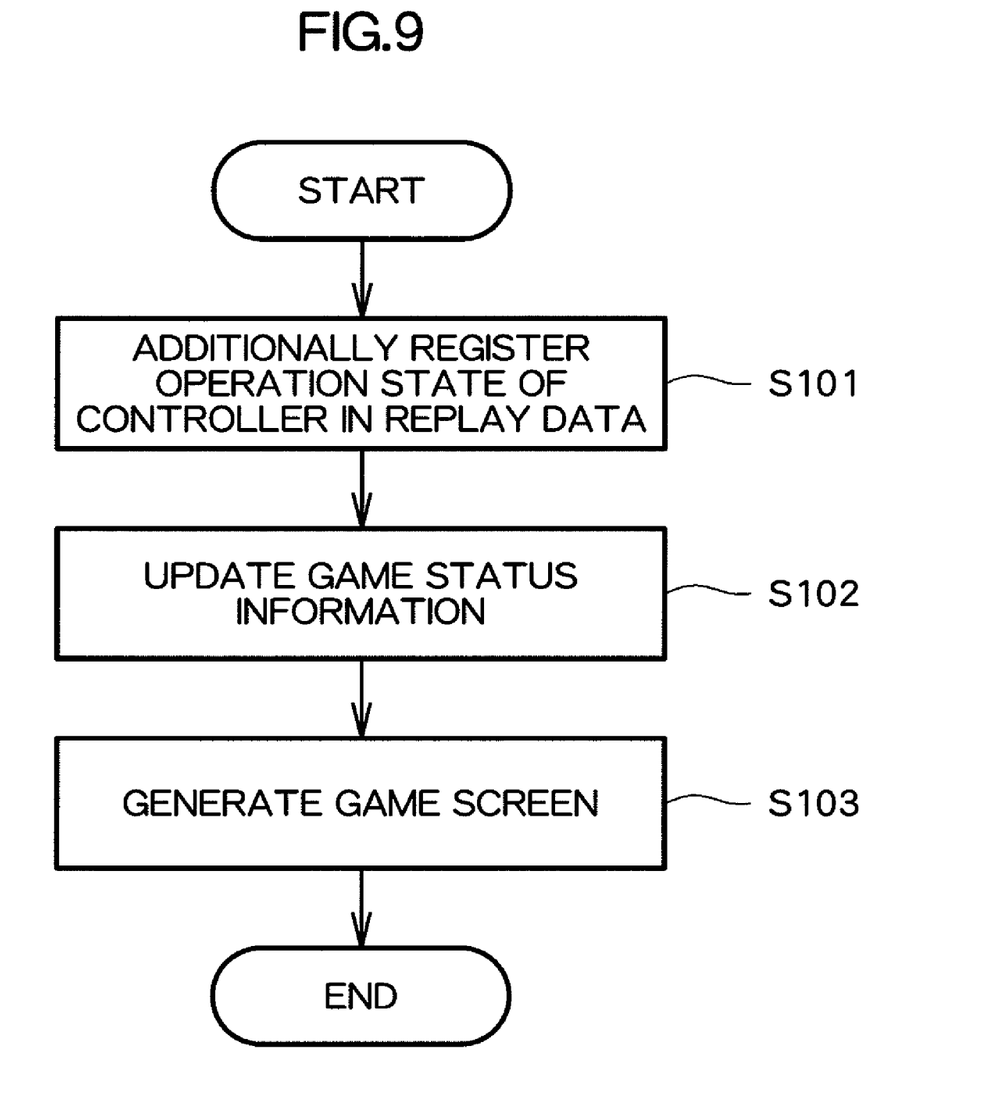
FIG. 9 is a flowchart showing a process executed in a game play part.

First, a process executed in the game play part will be described. FIG. 9 is a flowchart primarily showing processes, among the processes which are periodically executed by the game machine 10 in the game play part at a predetermined period (every $1/60^{th}$ of second in the present embodiment), related to the present invention. This process is realized by a program which is read from the DVD-ROM 25 being executed by the microprocessor 14.

As shown in FIG. 9, in this process, operation states of the operation members of the controller 32 are obtained, and operation information indicating the operation states is additionally registered in the replay data (S101). Then, the game status information is updated (S102). For example, the state of the player character object 50 stored in the game status information storage unit 84 may be updated based on the operation state of the controller 32 and the state of the enemy character object 52 stored in the game status information storage unit 84 may be updated according to a predetermined algorithm. After the update of the game status information is completed, the game screen is generated on the VRAM (S103). The game screen generated on the VRAM is displayed on and output to the monitor 18 at a predetermined timing.

Figure 10:
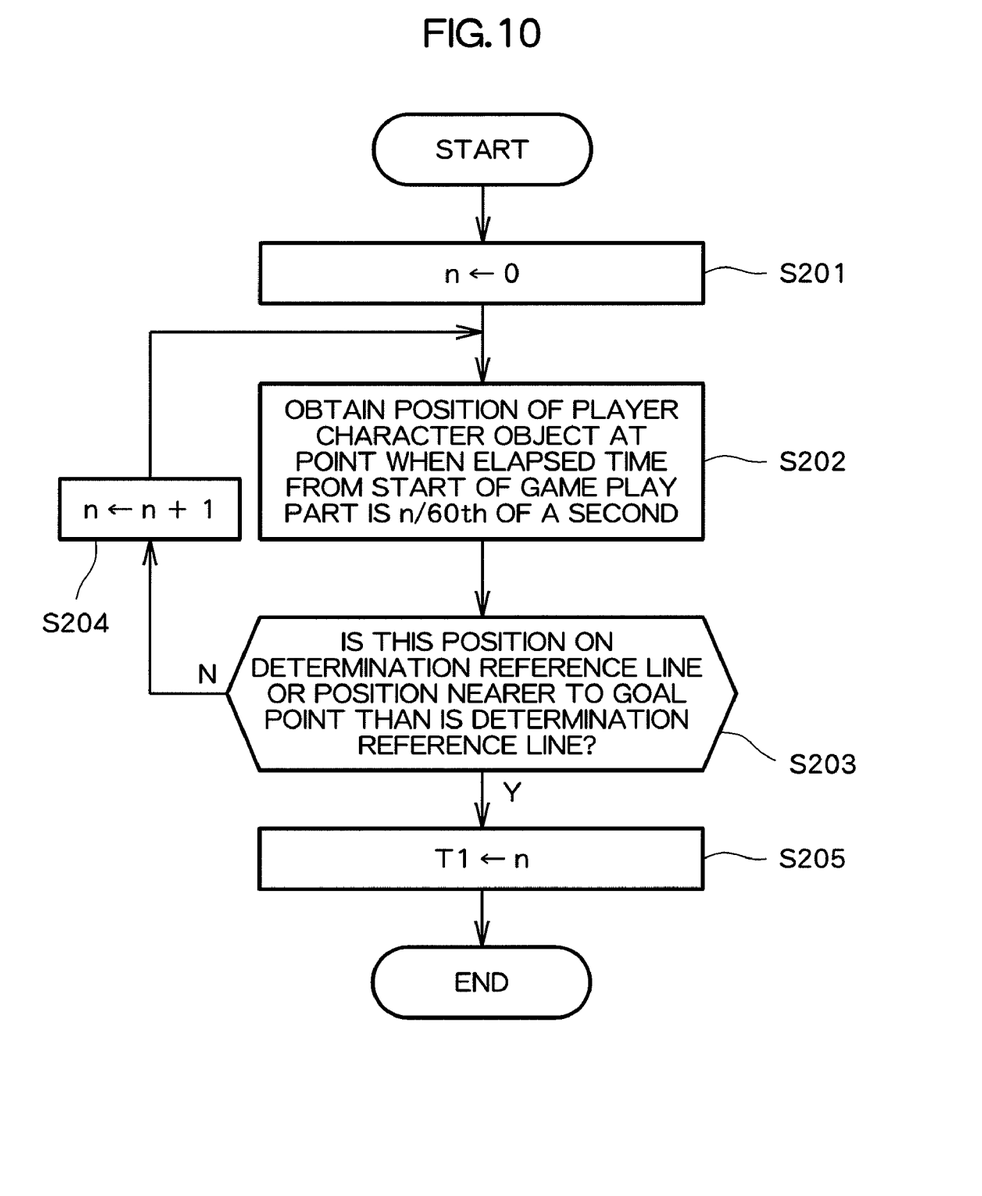
FIG. 10 is a flowchart showing a process related to a video image watching part.
Figure 11:
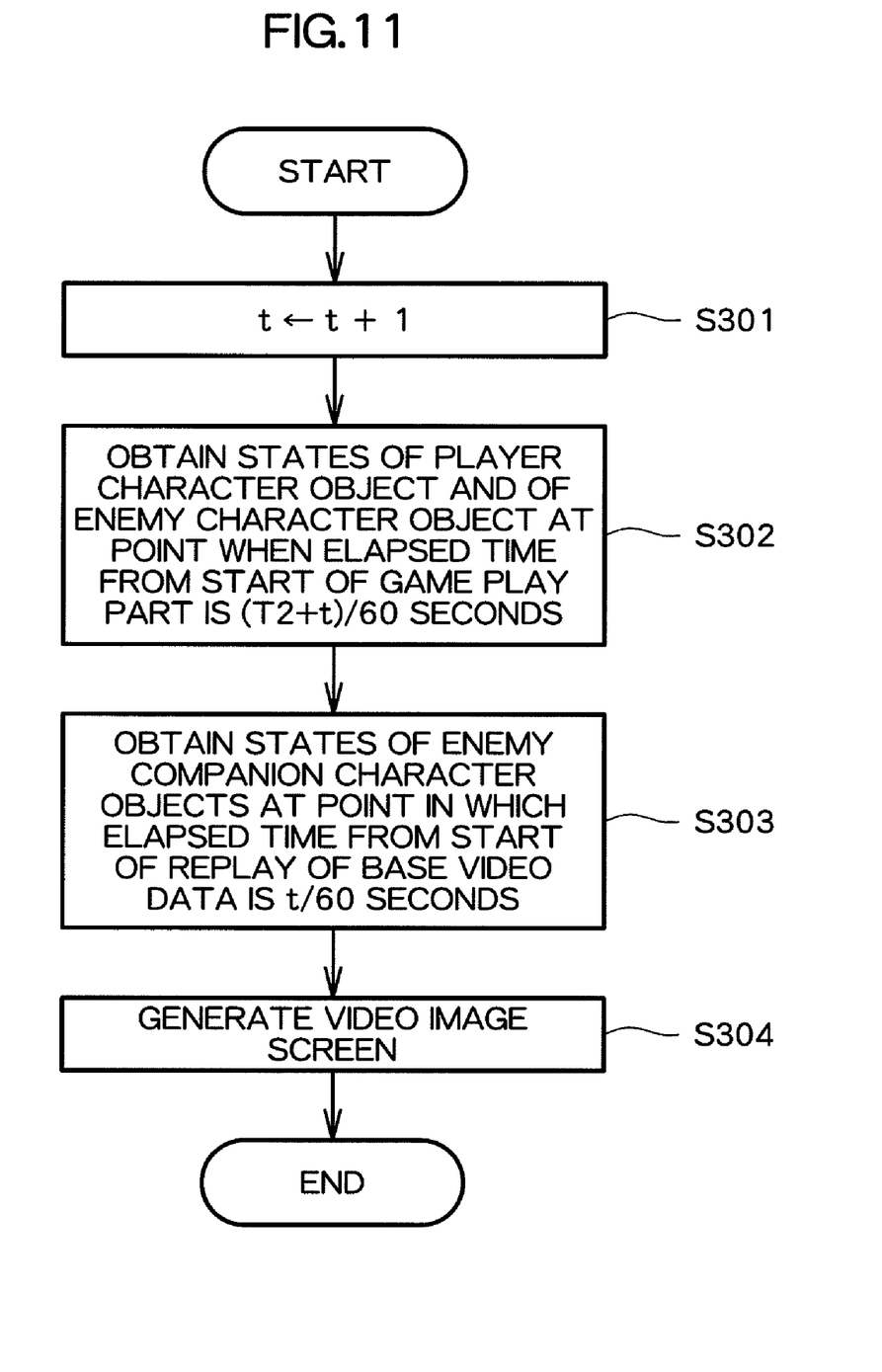
FIG. 11 is a flowchart showing a process related to a video image watching part.
Figure 12:
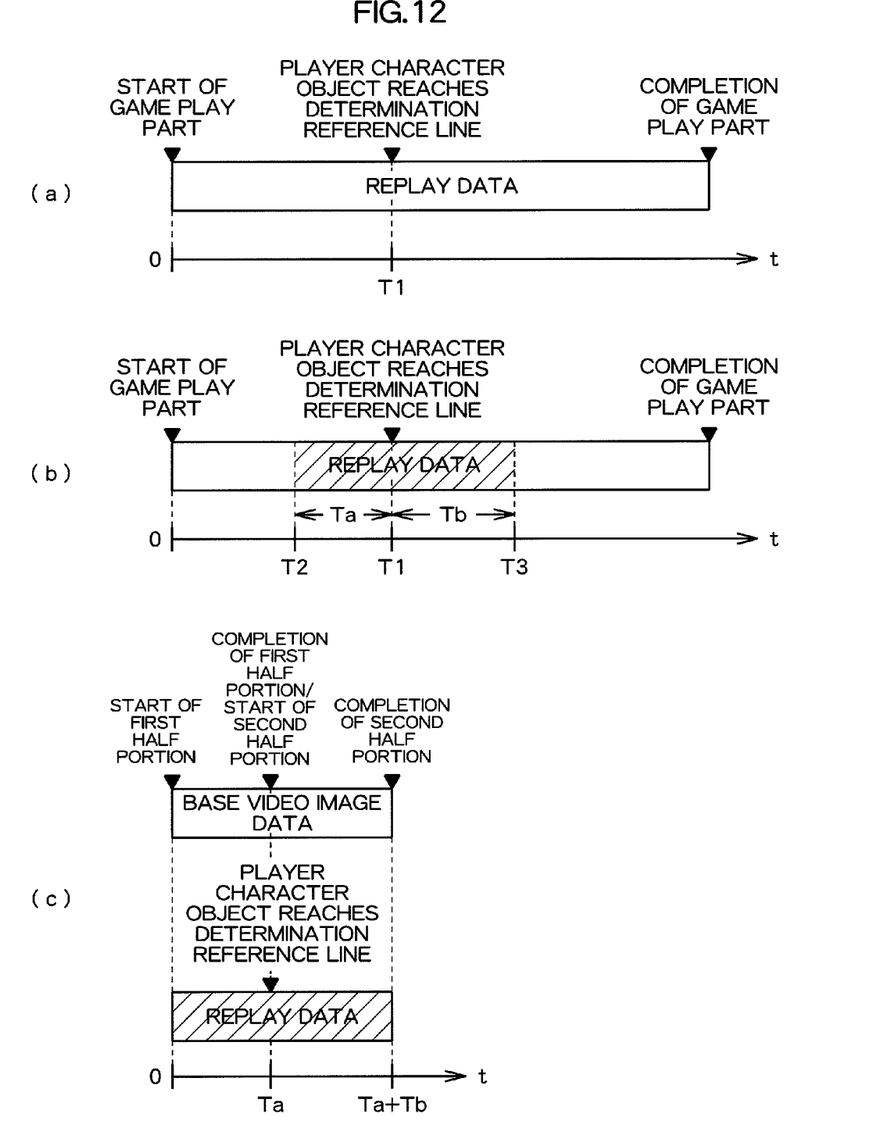
FIG. 12 is a diagram for explaining a content of a process related to a video image watching part.

Next, a process related to the video image watching part will be described. FIGS. 10 and 11 are flowcharts showing processes related to the video image watching part. FIG. 10 is a flowchart showing a process executed by the game machine 10 when the game play part is cleared and the game transitions to the video image watching part (that is, when the video image watching part is started). FIG. 11 is a flowchart primarily showing processes, among the processes periodically executed by the game machine 10 at every predetermined period ($1/60^{th}$ of second in the present embodiment) after the video image watching part is started, related to the present invention. The processes of FIGS. 10 and 11 are also realized by a program which is read from the DVD-ROM 25 being executed by the microprocessor 14. FIG. 12 is a diagram for explaining content of the process executed in the video image watching part (in particular, the content of the process related to the replay data).

First, a process executed when the video image watching part is started will be described. In the process executed when the video image watching part is started, a time T1 (refer to FIG. 12(a)) required in the game play part for the player character object 50 to reach the determination reference line is obtained. In the present embodiment, the time T1 is obtained in units of $1/60$ seconds.

More specifically, as shown in FIG. 10, first, a variable n is initialized to 0 (S201). Then, a position of the player character object 50 at the point when an elapsed time from the start of the game play part is n/60 seconds is obtained (S202). The state (such as position and posture) of the player character object 50 at the point when the elapsed time from the start of the game play part is n/60 seconds is obtained by sequentially reading n operation information from the first operation information recorded in the replay data and changing the state of the player character object 50 from the initial state of the player character object 50 in the game play part according to the algorithm used in the game play part (algorithm which is used for updating the state of the player character object 50 based on the operation state of the controller 32). In this step, if the value of the variable n is 0, the initial position of the player character object 50 in the game play part is obtained.

Then, it is determined whether or not the position obtained in S202 is a "position on the determination reference line 76" or a "position nearer to the goal point G than is the determination reference line 76" (S203). When the position obtained in S202 is not the "position on the determination reference line 76" or the "position nearer to the goal point G than is the determination reference line 76", that is, when the position is a "position nearer to the start point S than is the determination reference line 76", the variable n is incremented (S204), and the processes of S202 and S203 are again executed. When, on the other hand, the position obtained in S202 is the "position on the determination reference line 76" or the "position nearer to the goal point G than is the determination reference line 76", the value of the variable n is obtained as the "time T1 required for the player character object 50 to reach the determination reference line in the game play part" (S205).

Next, a process which is periodically executed at every predetermined period after the video image watching part is started will be described. As shown in FIG. 11, in the process periodically executed at every predetermined period after the start of the video image watching part, first, a variable t is incremented (S301). An initial value of the variable t is 0, and the initialization of the variable t is executed when the video image watching part is started.

Then, the states of the player character object 50 and of the enemy character object 52 at the point in which the elapsed time from the start of the game play part is (T2+t)/60 seconds are obtained (S302). Here, the time T2 is determined based on time T1 which is obtained when the video image watching part is started (refer to FIG. 10). More specifically, the time T2 is a time satisfying a condition of T2=T1−Ta as shown in FIG. 12(b). The time Ta is the length of time period of the first half portion of the base video image as described above. In the present embodiment, the time T2 is also obtained in units of $1/60^{th}$ of a second.

The state of the player character object 50 at the point when the elapsed time from the start of the game play part is (T2+t)/60 seconds is obtained in a manner similar to the process of S202 of FIG. 10. In addition, the state of the enemy character object 52 at the point when the elapsed time from the start of the game play part is (T2+t)/60 seconds is obtained by changing the state of the enemy character object 52 from the initial state of the enemy character object 52 in the game play part according to the algorithm which is used in the game play part (algorithm which is used for updating the state of the enemy character object 52).

Then, the states of the enemy companion character objects 54a and 54b at the point when the elapsed time from the start of the reproduction of the base video image is t/60 seconds are obtained based on the base video image data (S303).

Then, a video image screen is generated in the VRAM (S304). More specifically, an image showing a scene of the "virtual three-dimensional space 60a in which the player character object 50, the enemy character object 52, and the enemy companion character objects 54a and 54b are placed in the states obtained in S302 and S303" viewed from the virtual camera 74a is generated in the VRAM. Then, the bubble images 56a and 56b are written over and drawn on the image generated on the VRAM so that the video image screen (refer to FIGS. 4 and 5) is generated in the VRAM. The video image screen generated on the VRAM is displayed on the monitor 18 at a predetermined timing.

Because the video image screen is generated in a manner as described above in the present embodiment, as shown in FIGS. 12(b) and 12(c), a video image in which the "base video image which is based on the base video image data" and the "replay video image which is based on the replay data of the period in which the elapsed time from the start of the game play part is greater than or equal to T2 and less than or equal to T3" are combined is displayed on the video image screen. Here, the time T3 is a time which satisfies a condition of T3=T2+Ta+Tb. As described above, the time Ta is the time period length of the first half portion of the base video image and the time Tb is the time period length of the second half portion of the base video image. If the time of starting the display of the second half portion of the base video image (time when the scene of the enemy companion character objects 54a and 54b noticing the player character object 50 is displayed) and the time of displaying the player character object 50 reaching in front of the door object 68 (window 69) in the replay video image deviate from each other, the player would feel unnatural, and there is a possibility that the interest of the game will be reduced. In consideration of this, in the present embodiment, the base video image and the replay video image are combined such that these times are synchronized and the combined video image is displayed in the video image screen, and thus the player will not feel unnatural.

As described, in the game machine 10, the playing content of the player in the game play part is reflected in the action of the player character object 50 appearing in the video image screen and the "scene of the player character object 50 appearing while the enemy companion character objects 54a and 54b are chatting, and the enemy companion character objects 54a and 54b noticing the player character object 50 and panicking" is expressed while not giving the player the unnatural feeling. With the video image screen as described above, the player can be further carried away into the game world, and the interest of the game can be improved.

The present invention is not limited to the above-described embodiment.

For example, the base video image data stored in the base video image data storage unit 92 may be data which indicates the base video image itself. More specifically, the base video image data may be data in which base images at every predetermined time ($1/60^{th}$ of a second in the present embodiment) are recorded. In this case, in S303 of FIG. 11, the t-th base image may be obtained. In S304 of FIG. 11, for example, after an image representing a scene of the virtual three-dimensional space 60a viewed from the virtual camera 74a is generated in the VRAM, the base image obtained in S303 may be written over and drawn on portions of the image generated in the VRAM other than the portions in which the player character object 50 and the enemy character object 52 are displayed. Then, the bubble images 56a and 56b may be written over and drawn on the image generated on the VRAM.

Alternatively, for example, it is also possible to employ a configuration in which, in the video image watching part, the replay data (replay video image) is replayed from a given point which is prior to the point when the elapsed time from the start of the game play part is T2 (refer to FIG. 12(b); here, this point is referred to as "point of T2"). For example, the replay data may be replayed from the beginning (at the point of starting the game play part). In this case, it is possible to monitor whether or not a time when the replay video image of the point of T2 is to be reproduced is reached, and when the time of reproducing the replay video image at the point of T2 is reached, an output of the video image in which the base video image and the replay video image are combined may be started.

Figure 13:
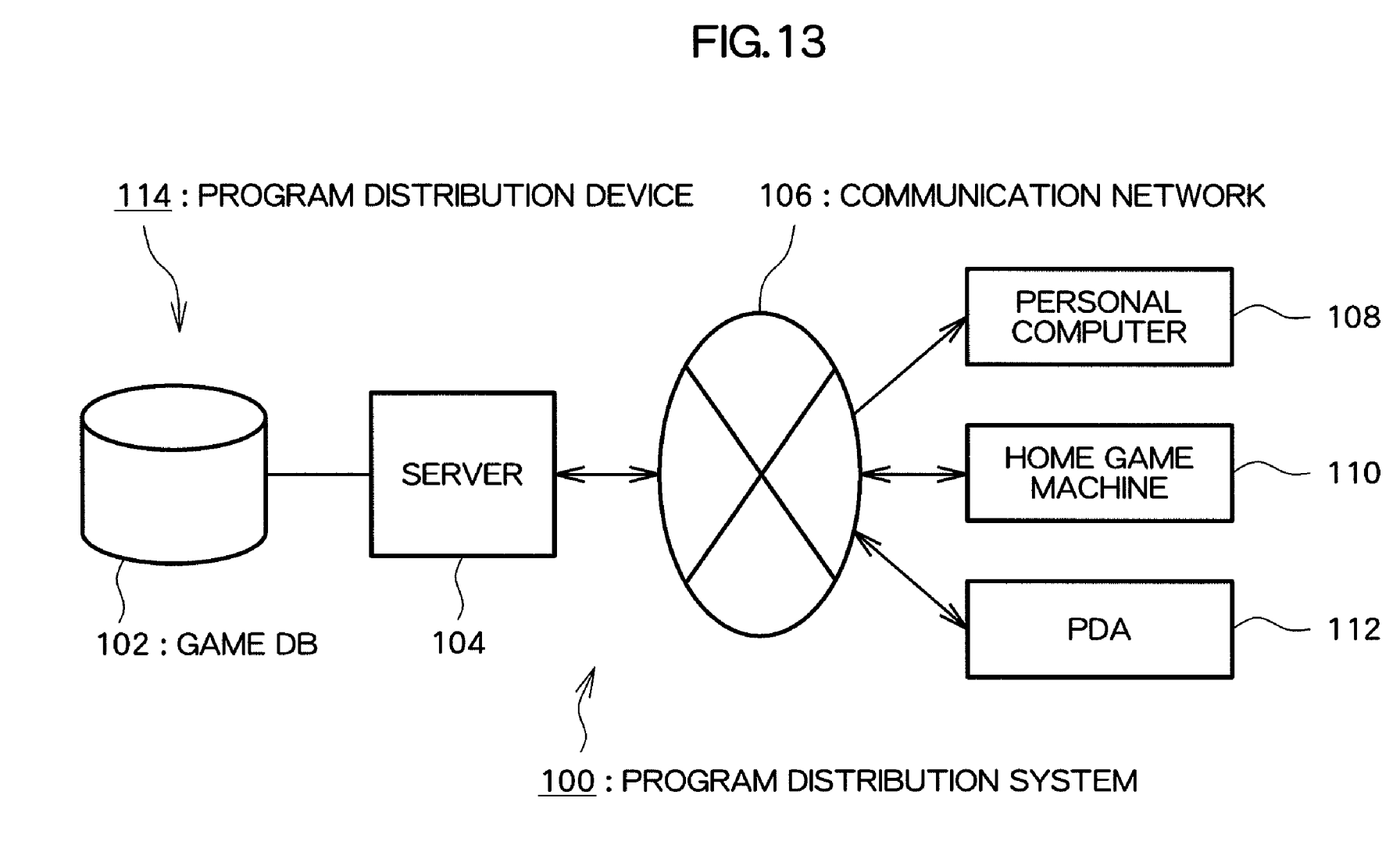
FIG. 13 is a diagram showing an overall structure of a program distribution system according to another embodiment of the present invention.

In addition, although in the above description the program is supplied from the DVD-ROM 25 which is the information storage medium to the home game machine 11, the program may be distributed to homes or the like through a communication network. FIG. 13 is a diagram showing an overall structure of a program distribution system which uses a communication network. A program distribution method according to the present invention will be described with reference to FIG. 13. As shown in FIG. 13, the program distribution system 100 comprises a game database 102, a server 104, a communication network 106, a personal computer 108, a home game machine 110, and a PDA (Personal Digital Assistant) 112. Of these, the game database 102 and the server 104 form a program distribution device 114. The communication network 106 comprises, for example, the Internet and a cable television network. In this system, a program similar to the stored content of the DVD-ROM 25 is stored in the game database (information storage medium) 102. When the demander requests distribution of a game using the personal computer 108, the home game machine 110, the PDA 112, or the like, the request is transmitted through the communication network 106 to the server 104. The server 104 reads the program from the game database 102 in response to the game distribution request, and transmits the program to the game distribution requesting device such as the personal computer 108, the home game machine 110, the PDA 112, or the like. In the described example, the game is distributed in response to the game distribution request, but it is also possible to transmit the game from the server 104 in one direction. In addition, not all programs necessary for realizing the game need to be distributed at once (package distribution), and the necessary portion may be distributed according to the phase of the game (split distribution). By distributing the game via the communication network 106 in this manner, it is possible for the demander to easily obtain the program.

The invention claimed is:

1. A game machine which executes a game in which an operation target moves in a game space according to an operation of a player, the game machine comprising:
reproduction data recording unit for recording reproduction data for reproducing a scene of the operation target moving in the game space during the game according to the operation of the player;
base video image data storage unit for storing base video image data for displaying a base video image which is prepared in advance and which represents a scene of a predetermined region of the game space;

timing determination unit for determining a timing of displaying, during the game, a scene of the operation target moving in the predetermined region in a reproduced video image, wherein the determining is based on the reproduction data; and video image display controlling unit for causing a combined video image, which is based on the base video image combined with the reproduced video image, to be displayed based on a determination result of the timing determination unit such that a time of displaying a predetermined scene of the base video image and a time of displaying the scene of the operation target moving in the predetermined region in the reproduced video image are synchronized during the game, wherein the timing determination unit determines the timing based on a distance of a player character object from a determination reference line set in consideration of a position and a posture of a virtual camera at the time of starting reproduction of the second half of the base video image, wherein a first portion of the reproduced video image is displayed during a first period that represents a first half of the base video image, and a second portion of the reproduced video image is displayed during a second period that represents a second half of the base video image, and wherein the determination reference line is indicative of a position of an enemy character object relative to the player character object.

2. A control method of a game machine which executes a game in which an operation target moves in a game space according to an operation of a player, the method comprising:

a reproduction data recording step in which reproduction data for reproducing a scene of the operation target moving in the game space during the game according to the operation of the user is recorded;

a timing determination step in which a time of displaying, during the game, a scene of the operation target moving in a predetermined region of the game space in a reproduced video image, wherein the determining is based on the reproduction data; and a video image display controlling step in which base video image data is read from a base video image data storage unit for storing the base video image data for displaying a base video image which is prepared in advance and which represents a scene of the predetermined region, and a video image, which is based on the base video image combined with the reproduced video image, is caused to be displayed on a display unit based on a determination result in the timing determination step such that a time of displaying a predetermined scene of the base video image and a time of displaying the scene of the operation target moving in the predetermined region in the reproduced video image are synchronized during the game, wherein the timing determination step determines the timing based on a distance of a player character object from a determination reference line set in consideration of a position and a posture of a virtual camera at the time of starting reproduction of the second half of the base video image, wherein a first portion of the reproduced video image is displayed during a first period that represents a first half of the base video image, and a second portion of the reproduced video image is displayed during a second period that represents a second half of the base video image, and wherein the determination reference line is indicative of a position of an enemy character object relative to the player character object.

3. A non-transitory computer readable information storage medium storing a program for causing a computer to function as a game machine which executes a game in which an operation target moves in a game space according to an operation of a player, the program causing the computer to function as:

reproduction data recording unit for recording reproduction data for reproducing a scene of the operation target moving in the game space during the game according to the operation of the player;

base video image data storage unit for storing base video image data for displaying a base video image which is prepared in advance and which represents a scene of a predetermined region of the game space;

timing determination unit for determining a time of displaying, during the game, a scene of the operation target moving in the predetermined region in a reproduced video image, wherein the determining is based on the reproduction data; and video image display controlling unit for causing a combined video image, which is based on the base video image combined with the reproduced video image, to be displayed based on a determination result of the timing determination means such that a time of displaying a predetermined scene of the base video image and a time of displaying the scene of the operation target moving in the predetermined region in the reproduced video image are synchronized during the game, wherein the timing determination unit determines the timing based on a distance of a player character object from a determination reference line set in consideration of a position and a posture of a virtual camera at the time of starting reproduction of the second half of the base video image, wherein a first portion of the reproduced video image is displayed during a first period that represents a first half of the base video image, and a second portion of the reproduced video image is displayed during a second period that represents a second half of the base video image, and wherein the determination reference line is indicative of a position of an enemy character object relative to the player character object.

* * * * *